US007195941B2

United States Patent
Lu et al.

(10) Patent No.: US 7,195,941 B2
(45) Date of Patent: Mar. 27, 2007

(54) OPTICAL DEVICES AND METHODS TO CONSTRUCT THE SAME

(75) Inventors: Daoqiang Lu, Chandler, AZ (US); Gilroy Vandentop, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 348 days.

(21) Appl. No.: 10/397,580

(22) Filed: Mar. 26, 2003

(65) Prior Publication Data

US 2004/0190831 A1  Sep. 30, 2004

(51) Int. Cl.
*H01L 21/00* (2006.01)
*H32B 6/36* (2006.01)

(52) U.S. Cl. .............. 438/31; 257/E21.123; 385/83
(58) Field of Classification Search .............. 438/31; 385/83
See application file for complete search history.

(56) References Cited

U.S. PATENT DOCUMENTS 6,660,548 B2 * 12/2003 Naydenkov et al. .......... 438/26
6,768,826 B2 * 7/2004 Ayadi ........................ 385/14
6,973,225 B2 * 12/2005 Nguyen et al. ............... 385/14
7,013,055 B2 * 3/2006 Hayamizu et al. ........... 385/14
2002/0005294 A1 * 1/2002 Mayer et al. ............... 174/260

OTHER PUBLICATIONS

VCSEL (Verticle Cavity Surface Emitting Laser), http://www.lasermate.com/vcsel.htm, as printed on Feb. 24, 2003.
Verticle Cavity Surface Emitting Laser, http://whatis.techtarget.com/definition/0,,sid9_gci803517,00.html, as printed on Feb. 24, 2003.

* cited by examiner

*Primary Examiner*—W. David Coleman
(74) *Attorney, Agent, or Firm*—Hanley, Flight & Zimmerman, LLC

(57) ABSTRACT

Optical devices and methods for constructing the same are disclosed. An example optical device includes an optical transmitter, a photodetector and a waveguide optically coupling the optical transmitter and the photodetector. It also includes a substrate having a first cavity to receive the optical transmitter and a second cavity to receive the second transmitter. The first and second cavities are located and dimensioned to passively align the optical transmitter, the waveguide and the photodetector when the transmitter is inserted into the first cavity and the photodetector is inserted into the second cavity.

35 Claims, 6 Drawing Sheets

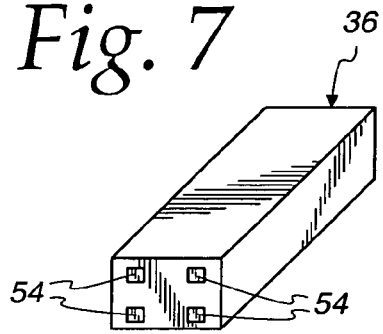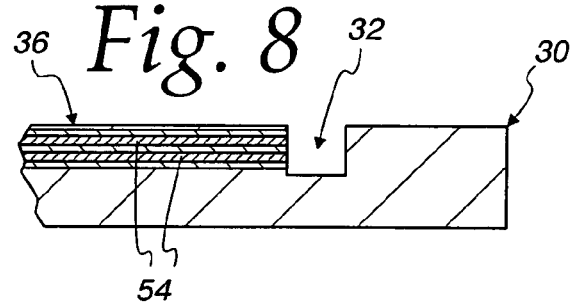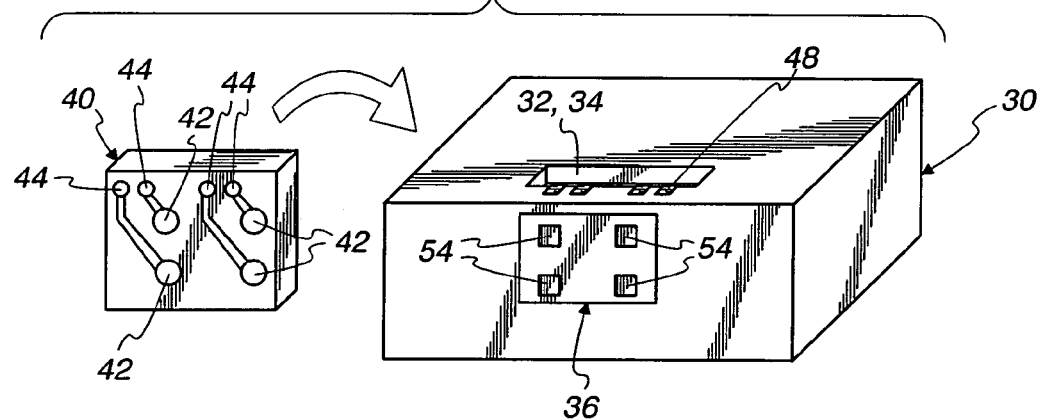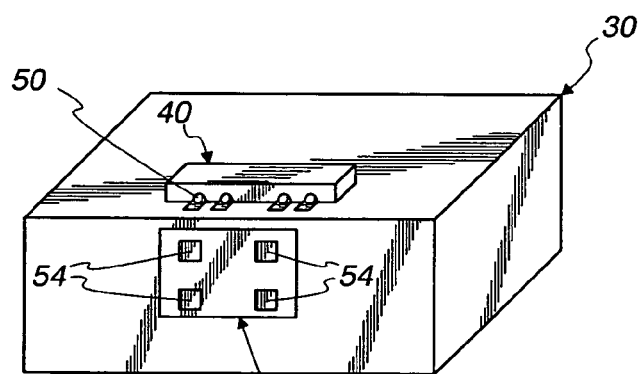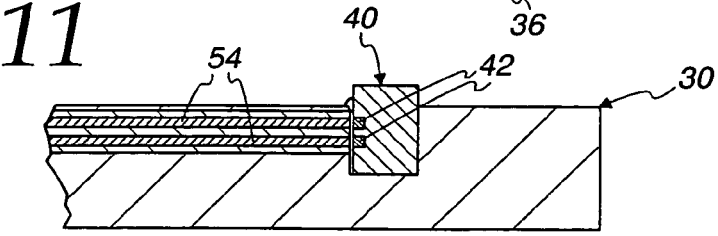

OPTICAL DEVICES AND METHODS TO CONSTRUCT THE SAME

FIELD OF THE DISCLOSURE

This disclosure relates generally to optical devices, and, more particularly, to optical devices and methods to construct the same.

BACKGROUND

The coherent light generated by edge emitting laser diodes is emitted in one or more planes that are substantially parallel to the boundaries between the semiconductor layers that form the laser. More recently, vertical cavity surface emitting lasers (VCSEL) have been developed. Unlike edge emitting laser diodes, VCSELs are laser diodes that are fabricated to emit light in one or more planes that are substantially perpendicular to the boundaries formed between their semiconductor layers. VCSELs appear to be advantageous over edge emitting laser diodes in several respects. For example, VCSELs generally require lower power and are less expensive to manufacture than their edge emitting counterparts.

An example prior art optical device 10 is shown in FIG. 1. In the example of FIG. 1, a VCSEL 12 is optically coupled to a photodetector 14 via a waveguide 16. Because, by definition, the light generated by a VCSEL is transmitted in a plane that is generally perpendicular to the surface of the VCSEL, the light from a VCSEL 12 is typically coupled to a waveguide 16 by an expensive and complicated end finish of the waveguide 16. For example, an end of the waveguide 16 may be cut and polished to form a 45 degree total reflection mirror 18 that re-directs a substantial portion of the light emitted by the laser 12 approximately 90 degrees from its initial path into the waveguide 16. Typically, the opposite end of the waveguide 16 is also formed into a 45 degree mirror 18 to re-direct the light from the waveguide 16 toward the photodetector 14 as shown in FIG. 1.

This complicated mechanism for directing the light generated by the VCSEL 12 to the photodetector 14 is expensive and difficult to manufacture. For example, to manufacture a device 10 such as that shown in FIG. 1, the die-substrate standoff height (e.g., the distance between the VCSEL 12 and a substrate 20 of the optical device 10 and/or the distance between the photodetector 14 and the substrate 20 (e.g., a printed circuit board) of the optical device 10) must be carefully controlled. Further, the optically active area of the VCSEL 12 must be precisely aligned with one of the end mirrors 18 of the waveguide 16 and the active area of the photodetector 14 must be precisely aligned with the opposite end mirror 18 of the waveguide 16.

The tolerances associated with the die-substrate height standoff requirements and the VCSEL-to-waveguide and waveguide-to-photodector alignment requirements dictate that the placement/bonding of the VCSEL 12, the photodetector 14, and sometimes the waveguide 16 be carried out through an active alignment technique. An active alignment technique is a feedback technique in which a laser (e.g., the VCSEL) associated with the component(s) being placed is energized, and the position(s) of the component(s) being placed are adjusted to maximize an output of the energized laser at an output of those component(s). When the output is maximized, the component(s) are aligned and bonded in place. Unfortunately, active alignment processes such as that described above are slow and do not lend themselves to mass production.

Additionally, prior art optical devices 10 such as that shown in FIG. 1 typically do not permit the use of two dimensional waveguide arrays. As a result, such prior art devices have limited bandwidth.

BRIEF DESCRIPTION OF THE DRAWINGS

FIG. 7 is a perspective view of a section of an example waveguide array from the optical device of FIG. 6.

FIG. 8 is a partial cross-sectional view of another example substrate.

FIG. 9 is a perspective view of the example VCSEL/photodetector of FIG. 3 and a section of the example substrate of FIG. 8.

FIG. 10 is a view similar to FIG. 9 but showing the example VCSEL/photodetector positioned within a cavity of the example substrate of FIG. 8.

FIG. 11 is a view similar to FIG. 8 but showing the example VCSEL/photodetector positioned within a cavity of the example substrate.

DETAILED DESCRIPTION

Figure 1:
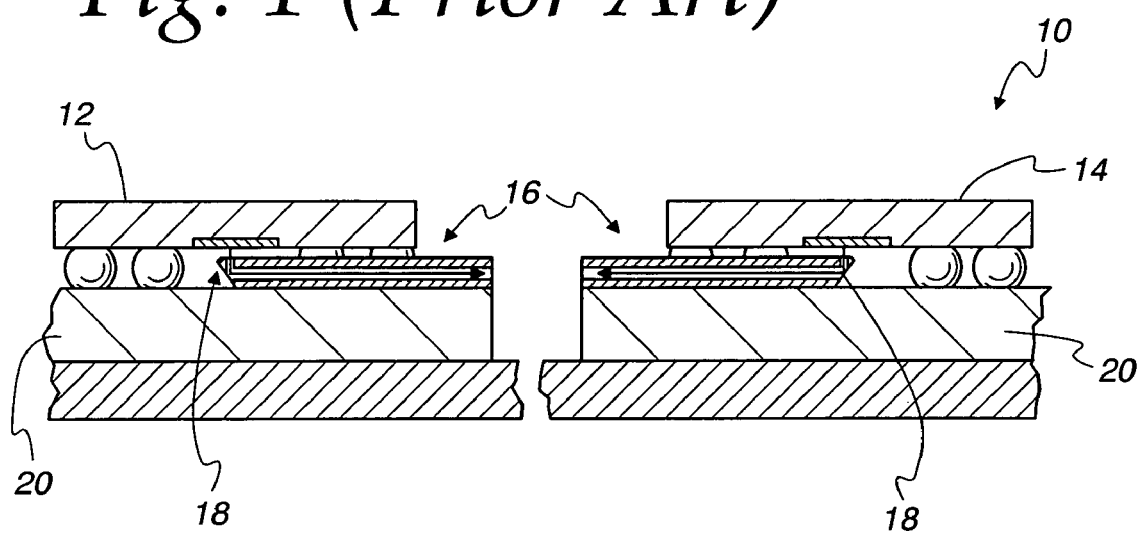
FIG. 1 is a schematic illustration of a prior art optical device.
Figure 2:
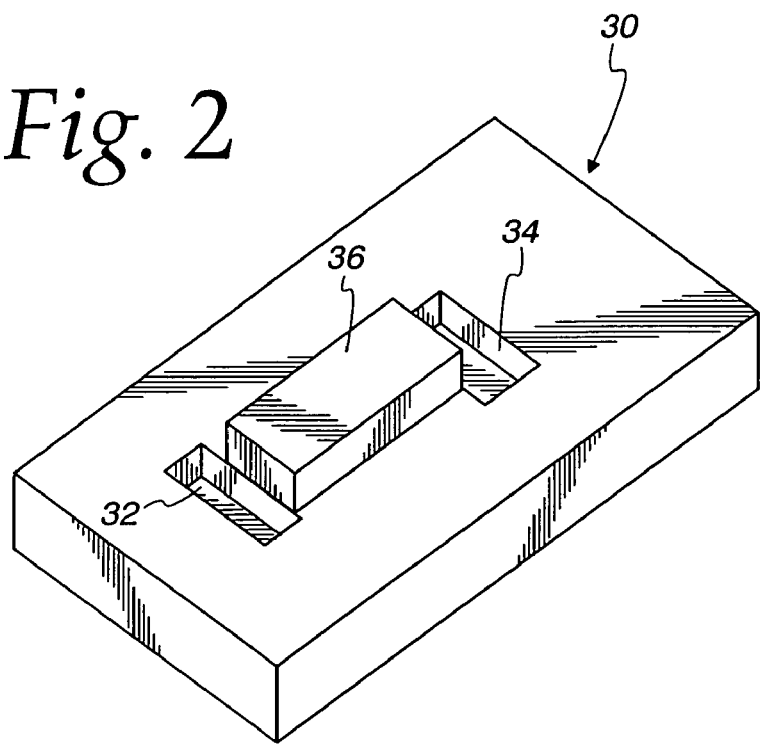
FIG. 2 is a perspective view of an example substrate.

FIG. 2 is a perspective view of an example substrate 30. The illustrated substrate 30 is structured to passively align an optical transmitter, a waveguide 36 and a photodetector. In particular, the substrate 30 includes a first cavity 32 that is dimensioned to receive the optical transmitter and a second cavity 34 which is dimensioned to receive the photodetector. A waveguide 36 is located between the first and second cavities 32, 34. The waveguide 36 may be bonded to the surface of the substrate 30 or integrated with the substrate 30. In either event, the first and second cavities 32, 34 are located and positioned to passively align the optical transmitter, the waveguide 36 and the photodetector when the optical transmitter is positioned in the first cavity 32 and the photodetector 34 is positioned in the second cavity. To this end, the cavities 32, 34 are precision machined in the substrate 30 to precisely locate a corresponding one of the transmitter and the photodetector in a predetermined position relative to the waveguide 36. This high precision machining of the cavities 32, 34 in the substrate 30 enables an optical device to be assembled from the substrate 30, the waveguide 36, an optical transmitter and a photodetector without performing active alignment of the same.

Figure 3:
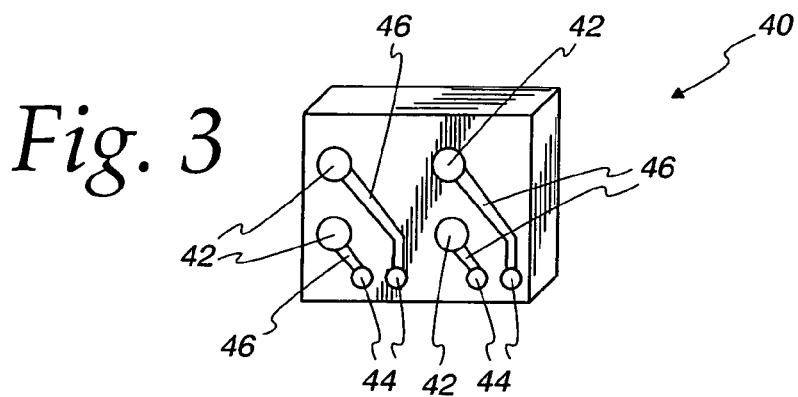
FIG. 3 is a perspective view of an example VCSEL and/or photodetector.

An example optical element 40 is schematically illustrated in FIG. 3. The optical element 40 may be implemented by an optical transmitter such as a VCSEL and/or by a photodetector. Therefore, the optical element 40 is interchangeably referred to herein as an optical transmitter/photodetector 40 or an optical element 40.

The optical element 40 of FIG. 3 includes four optically active areas 42, although persons of ordinary skill in the art will readily appreciate that greater or fewer optically active areas 42 could alternatively be employed. If the optical element 40 is a transmitter such as a VCSEL, the optically active areas 42 are areas at which coherent light is output by the transmitter 40. If the optical element 40 is a photodetector, the optically active areas 42 are areas that convert received light into electrical current. In either event, the illustrated optically active areas 42 are coupled to contacts 44 via metal traces 46. The contacts 44 of the illustrated example are formed by solder bumps that are formed in electrically conductive contact with a corresponding one of the traces 46. The metal traces 46 may be implemented by any conventional, electrically conductive material such as copper.

Figure 4:
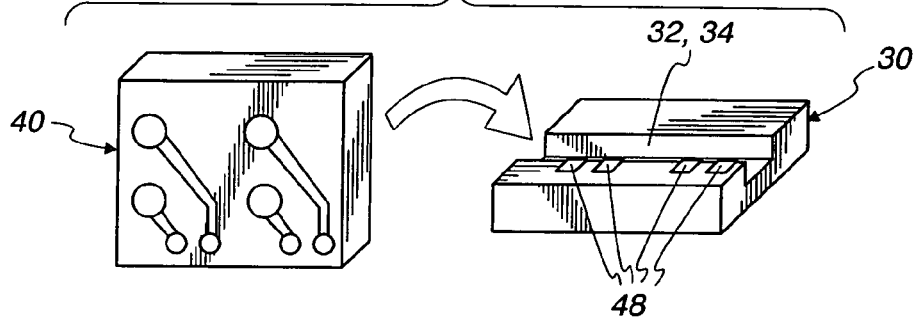
FIG. 4 is a perspective view of the example VCSEL/photodetector of FIG. 3 and a portion of the example substrate of FIG. 2.
Figure 5:
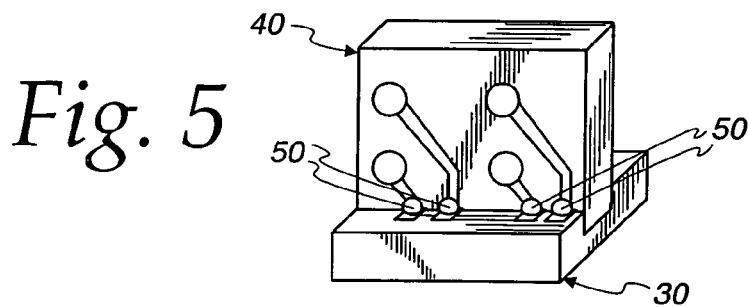
FIG. 5 is a view similar to FIG. 4 but showing the example VCSEL/photodetector positioned within a cavity of the example substrate of FIG. 2.

As illustrated in the example of FIGS. 4 and 5, the optical element 40 is secured in a corresponding one of the cavities 32, 34 of the substrate 30. As mentioned above, the cavities 32, 34 are manufactured to very tight tolerances (e.g., less than approximately five micrometers) to ensure that securing the optical transmitter/photodetector 40 in the corresponding cavity 32, 34 sufficiently aligns the optically active area(s) 42 of that optical element 40 with corresponding waveguide(s) as explained in further detail below. The optical element 40 may be secured in its cavity 32, 34 with any conventional bonding agent such as epoxy.

In the illustrated example, in addition to or instead of bonding the optical element 40 in the cavity 32, 34 with a conventional bonding agent, the optical element 40 is secured in the corresponding cavity 32, 34 via the solder bumps 44. For instance, in the illustrated example the substrate 30 includes a plurality of electrically conductive contacts 48 located either in or adjacent the top surface of the substrate 30. The contacts 48 of the substrate 30 are positioned adjacent the cavities 32, 34 in locations to engage the solder bumps 44 of the optical elements 40 when the optical elements 40 are positioned within their corresponding cavities 32, 34. Thus, when the optical elements 40 are positioned within the cavities 32, 34, the solder bump(s) of the optical element 40 are reflowed to form solder joints 50 (see FIG. 5) between the optical elements 40 and the substrate 30. The solder joints mechanically and electrically couple the contacts 44 of the optical elements 40 to the contacts 48 of the substrate 30. As will be appreciated by persons of ordinary skill in the art, the contacts 48 of the substrate 30 may be electrically coupled to circuitry either on the substrate 30 or off the substrate 30 to excite the optically active area(s) 42 of the transmitter 40 and/or to receive the signal(s) generated by the optically active area(s) of the photodetector 40.

Figure 6:
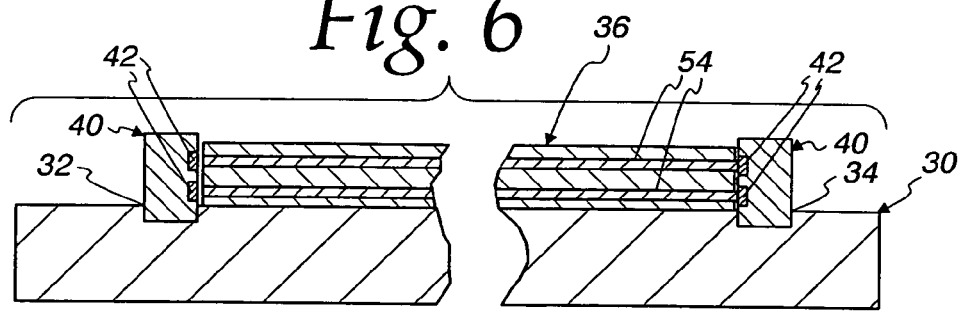
FIG. 6 is a cross-sectional view of an example optical device incorporating the example substrate of FIG. 2 and the example VCSEL/photodetector of FIG. 3.

As mentioned above, the waveguide 36 carried by the substrate 30 may be positioned above a top surface of the substrate 30 (see FIG. 6), or integrated in the substrate 30 (see FIGS. 8–11). If the waveguide 36 is positioned above the top surface of the substrate 30 as shown in FIG. 6, the solder bumps 44 of the optical elements 40 are located beneath the optically active areas 42 of the optical transmitter/photodetector 40. Thus, when the optical elements 40 are inserted into their corresponding cavities 32, 34, the contacts 44 of the optical elements 40 are positioned adjacent to and/or in contact with the contacts 48 of the substrate 30 to facilitate the creation of the solder joints 50 mentioned above. Also, when the optical elements 40 are inserted into their corresponding cavities 32, 34, the optically active area(s) 42 are positioned at the proper height and orientation to create an optical coupling to the waveguide(s) 36.

If the waveguide(s) 36 are positioned below the top surface of the substrate 30 (see FIGS. 8–11), the cavities 32, 34 may be bored deeper into the substrate 30 (compare FIGS. 6 and 8) such that the optically active areas 42 of the optical elements 40 are positioned at the proper height and orientation to optically couple the optical elements 40 to the waveguide(s) 36 when the optical elements 40 are positioned within their corresponding cavities 32, 34 (see FIGS. 10–11). In such an example, the solder bumps 44 of the optical elements 40 may be positioned above the active optical area(s) of the optical elements (see FIGS. 9 and 10). As a result, when the optical elements 40 are inserted into their cavities 32, 34, the active optical areas 42 of the optical elements 40 are positioned below the surface of the substrate 30, but the contacts 44 of the optical element 40 are positioned above the top surface of the substrate 30 in engagement with or adjacent the contacts 48 of the substrate 30 (see FIG. 10) to form the solder joints 50 as explained above.

As shown in FIG. 7, the waveguide 36 may be a waveguide array comprising a plurality of waveguide channels 54. In the illustrated example, the waveguide array 36 includes four waveguide channels 54. Two of the waveguide channels 54 are located in a first common horizontal plane. The other two of the waveguide channels are located in a second common plane that is vertically displaced from the first horizontal plane. Persons of ordinary skill in the art will appreciate that waveguide arrays having fewer or more waveguide channels than the illustrated array 36 may alternatively be employed. Such persons will also appreciate that waveguide arrays having different geometric arrangements of the waveguide channels 54 than the illustrated waveguide array 36 could also be employed. As already mentioned, the waveguide array 36 may be secured to the substrate 30 or integrally formed with the substrate. Further, the waveguide array 36 may be located generally above a top surface of the substrate 30 or beneath the surface of the substrate 30.

To construct an optical device such as the devices shown in FIGS. 3–6 and 8–11, a substrate 30 is precision machined to have a first cavity 32 dimensioned to receive and precisely position the optical transmitter 40 (e.g., a VCSEL) and a second cavity 34 dimensioned to receive and precisely position the photodetector 40. A waveguide 36 or a waveguide array 36 may be integrally formed with the substrate between the first and second cavities 32, 34. Alternatively, the waveguide or waveguide array 36 may be bonded to the substrate 30.

The optical transmitter 40 is then positioned in the first cavity 32 such that solder bump(s) 44 formed on a side (e.g., the active side) of the transmitter are located adjacent and/or in engagement with contact(s) 48 formed on or in the substrate 30. The photodetector is positioned within the second cavity 34 such that solder bump(s) 44 formed on a side (e.g., the active side) of the photodetector are located adjacent and/or in engagement with contact(s) 48 formed on or in the substrate 30. The solder bumps 44 are then melted to wet the metal contact pads 48 of the substrate 30 to thereby form solder joints 50 that mechanically and electrically couple the optical elements 40 to the substrate 30. The close tolerances of the cavities 32, 34 and the optical transmitter 40 and the photodetector 40 ensure that placing the optical elements 40 in their corresponding cavities achieves passive alignment with the waveguide channel(s) 54 and that active alignment is not necessary.

Although the examples described above employed a single substrate 30 defining two cavities 32, 34 dimensioned to receive two optical elements 40 such that a single substrate 30 carried at least two optical elements 40 and a waveguide 36, persons of ordinary skill in the art will appreciate that other numbers of substrates, waveguides, and/or optical elements may alternatively be employed. For example, as shown in FIGS. 12–15, an optical device may be constructed with two or more separate substrates.

Figure 12:
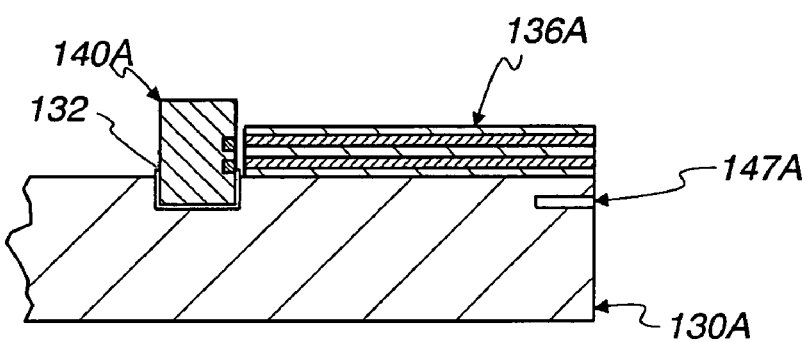
FIG. 12 is a partial cross-sectional view of a first assembly including a first substrate, a first optical element, and a first waveguide.

In the example of FIGS. 12–15, the optical device includes a first substrate 130A defining a cavity 132 which is dimensioned to receive a first optical element 140A. As in the examples described above, the cavity 132 is precision machined to close tolerances to ensure that positioning the optical element 140A within the cavity 132 achieves passive optical alignment. In the example of FIG. 12, a waveguide array 136A is mounted to the first substrate 130A.

Figure 14:
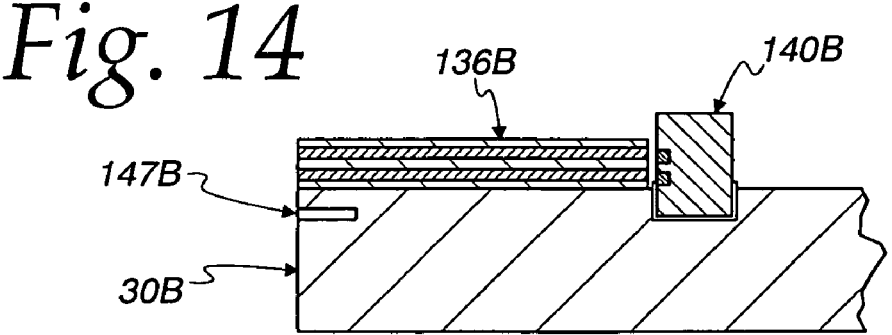
FIG. 14 is a partial cross-sectional view of a third assembly including a second substrate, a second optical element, and a second waveguide.

As shown in FIG. 14, the optical device also includes a second substrate 130B defining a cavity 134 which is dimensioned to receive a second optical element 140B. Like the cavity 132, the cavity 134 is precision machined to close tolerances to ensure that positioning the optical element 140B within the cavity 134 achieves passive optical alignment. In the example of FIG. 14, a waveguide array 136B is mounted to the second substrate 130B.

Figure 13:
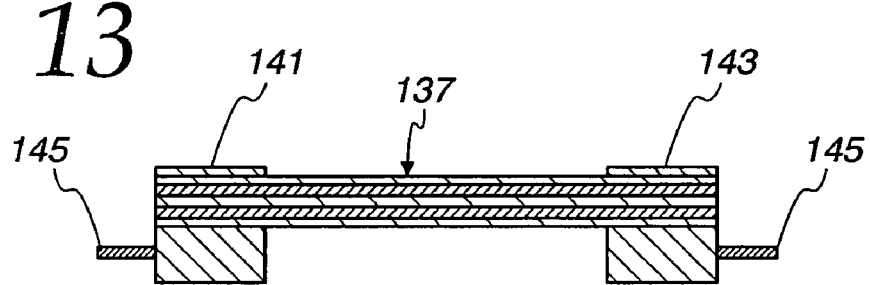
FIG. 13 is a partial cross-sectional view of a second assembly including a flying waveguide.
Figure 15:
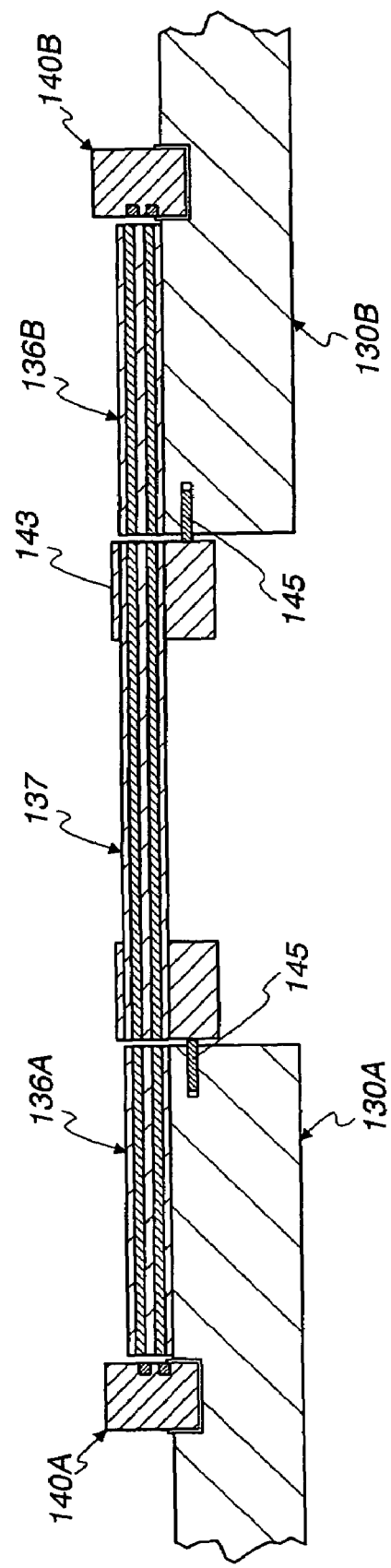
FIG. 15 is a cross-sectional view showing the assemblies of FIGS. 12–14 coupled to form an optical device.

To optically couple the first and second substrates 130A, 130B, the illustrated optical device is further provided with a flying waveguide 137 as shown in FIG. 13. The example flying waveguide 137 of FIG. 13 is a waveguide array having a first end mounted in a bore defined in a first connector 141 and a second end mounted in a bore defined in a second connector 143. Each of the connectors 141, 143 includes at least one alignment pin 145. As shown in FIGS. 12 and 14, each of the substrates 140A, 140B defines a bore 147A, 147B for receiving a respective one of the alignment pins 145. The pins 145 and the bores 147A, 147B are positioned and precision dimensioned such that inserting the pins 145 in their respective bores 147A, 147B passively aligns the first waveguide array 136A, the flying waveguide 137 and the second waveguide array 136B as shown in FIG. 15.

Although only two pins 145 and two bores 147A, 147B are shown in FIGS. 12–15, persons of ordinary skill in the art will appreciate that other numbers of alignment pins 145 and bores 147A, 147B may alternatively be employed. If, however, only one pin 145 is employed at each end of the flying waveguide 137, persons of ordinary skill in the art will appreciate that the oppositely disposed pins 145 should not be in concentric alignment to provide enhanced stability and greater resistance to unwanted rotation between the waveguide arrays 136A, 136B and 137.

Figure 16:
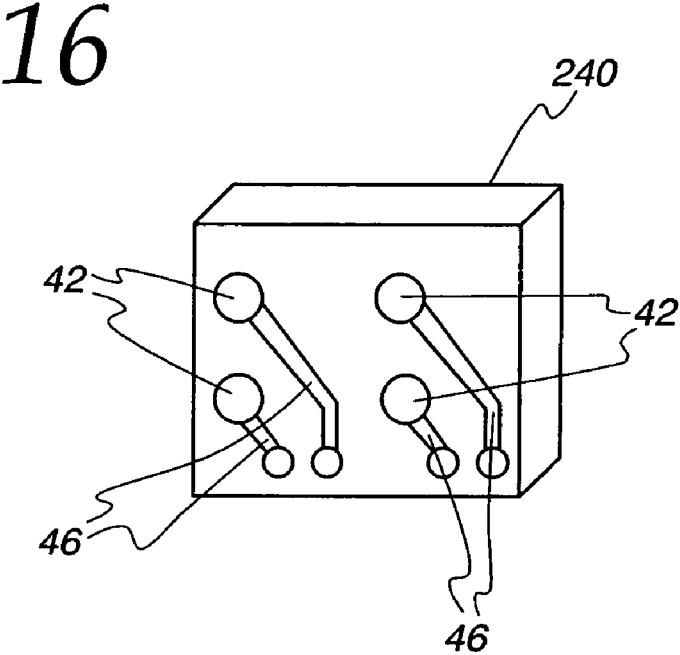
FIG. 16 is a perspective view of an alternative VCSEL/photodetector.
Figure 17:
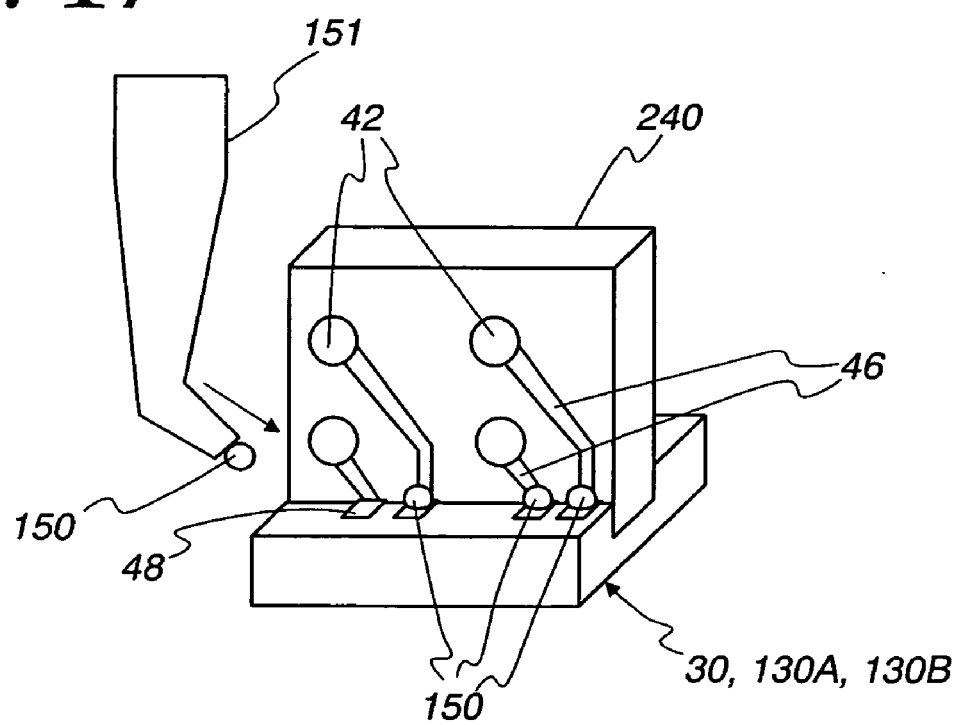
FIG. 17 is a view similar to FIG. 16 but showing the optical element of FIG. 16 being soldered in position within the cavity of an example substrate.

Although in the examples discussed above, the optical elements 40 include pre-deposited solder bumps 44, persons of ordinary skill in the art will appreciate that these preformed solder bumps 44 are optional. Alternatively, one or both of the optical elements 240 may exclude the pre-formed solder bumps as shown in the example of FIG. 16. Under such circumstances, after placing the optical element 240 into its intended cavity, a solder shooter 151 may be used to shoot molten solder balls 150 onto the metal contact pads 48 of the substrate 30, 130A, 130B and metal contact pads at the end of the traces 46 of the optical element 240. The molten solder balls wet the metal pads to form electrical connections.

From the foregoing, persons of ordinary skill in the art will readily appreciate that optical devices and methods of manufacturing the same have been disclosed. Such persons will further appreciate that the disclosed optical devices and methods of manufacture are advantageous in several respects. For example, because the optical devices illustrated in FIGS. 6 and 11 position their VCSELs 40 in planes perpendicular to their corresponding waveguide channels 56, the optical devices couple their VCSEL 40 to their waveguides 36 without requiring an intervening mirror. Similarly, because the photodetectors 40 are positioned in planes perpendicular to the waveguide channels 54, no intervening mirrors are required to couple the waveguide channels 54 to the photodetectors.

Also, because the illustrated optical devices employ cavities 32, 34 to mechanically pre-align their optical elements 40 with their waveguides 36, the illustrated devices can be assembled without employing an active alignment process and without requiring die-substrate standoff height control. As a result, the illustrated optical devices may be more susceptible to mass production and, thus, less costly to manufacture than their prior art counterparts. Furthermore, the illustrated devices may employ stacked waveguide arrays 36 to thereby increase the number of optical channels and, thus, the operational bandwidth of the devices.

Although certain example methods and apparatus have been described herein, the scope of coverage of this patent is not limited thereto. On the contrary, this patent covers all methods and apparatus fairly falling within the scope of the appended claims either literally or under the doctrine of equivalents.

What is claimed is:

1. A method of manufacturing an optical device comprising:
   positioning a first optical element in a first cavity located in a substrate and dimensioned to passively align the first optical element with a second structure when the first optical element is inserted into the first cavity, wherein the second structure is integrated with the substrate between the first and second cavities.

2. A method as defined in claim 1 wherein the first optical element is at least one of an optical transmitter and a photodetector.

3. A method as defined in claim 1 further comprising positioning a second optical element in a second cavity located in the substrate and dimensioned to passively align the second optical element with the second structure when the second optical element is inserted into the second cavity.

4. A method as defined in claim 3 wherein the second optical element is at least one of an optical transmitter and a photodetector.

5. A method as defined in claim 1 further comprising positioning a second optical element in a second cavity located in the substrate and dimensioned to passively align the second optical element with the first optical element when the second optical element is inserted into the second cavity and the first optical element is inserted in the first cavity.

6. A method as defined in claim 5 wherein the first optical element is at least one of an optical transmitter and a photodetector and the second optical element is at least one of an optical transmitter and a photodetector.

7. A method as defined in claim 1 further comprising precision machining the first cavity in the substrate.

8. A method as defined in claim 1 further comprising forming a solder joint between the first optical element and a first contact of the substrate.

9. A method as defined in claim 8 wherein forming the solder joint between the first optical element and the first contact of the substrate comprises reflowing a solder bump on a surface of the first optical element.

10. A method as defined in claim 8 wherein forming the solder joint between the first optical element and the first contact of the substrate comprises forming an electrical connection between the first optical element and a circuit associated with the substrate.

11. A method as defined in claim 8 wherein forming the solder joint between the first optical element and the first contact of the substrate comprises shooting molten solder into engagement with the first optical element and the first contact.

12. A method as defined in claim 1 wherein the second structure comprises a waveguide associated with the substrate.

13. A method as defined in claim 1 wherein positioning the first optical element within the first cavity further comprises positioning a solder bump associated with the first optical element adjacent a first contact of the substrate.

14. A method as defined in claim 13 wherein the solder bump is located below an optically active area of the first optical element.

15. A method as defined in claim 14 wherein the first contact is located adjacent a surface of the substrate.

16. A method as defined in claim 1 wherein the second structure comprises a waveguide.

17. A method as defined in claim 16 wherein the waveguide comprises a waveguide array.

18. A method as defined in claim 17 wherein the waveguide array comprises a first waveguide channel and a second waveguide channel.

19. A method as defined in claim 18 wherein the first and second waveguide channels are in a common horizontal plane.

20. A method as defined in claim 1 wherein the second structure comprises a waveguide array.

21. A method as defined in claim 20 wherein the waveguide array comprises a first waveguide channel and a second waveguide channel.

22. A method as defined in claim 21 wherein the first waveguide channel is vertically displaced from the second waveguide channel.

23. A method as defined in claim 21 wherein the first and second waveguide channels are in a common plane.

24. A method as defined in claim 1 wherein the first optical element comprises a vertical cavity surface emitting laser.

25. A method as defined in claim 24 wherein the second structure comprises a waveguide and the vertical cavity surface emitting laser is coupled to the waveguide without an intervening mirror.

26. A method as defined in claim 25 wherein a photodetector is optically coupled to the waveguide without an intervening mirror.

27. A method as defined in claim 1 wherein the first optical element is positioned within the first cavity without performing optical element-substrate height standoff control.

28. A method as defined in claim 1 wherein the substrate comprises a first substrate, and further comprising positioning a second optical element in a second cavity located in a second substrate and dimensioned to passively align the second optical element with a third structure when the second optical element is inserted into the second cavity.

29. A method of manufacturing an optical device comprising:
positioning a first optical element in a first cavity located in a substrate and dimensioned to passively align the first optical element with a second structure when the first optical element is inserted into the first cavity, wherein positioning the first optical element within the first cavity further comprises positioning a solder bump associated with the first optical element adjacent a first contact of the substrate, and wherein the solder bump is located above an active optical area of the first optical element and the active optical area of the first optical element is located below the surface of the substrate.

30. A method as defined in claim 29 wherein the first contact is located below a surface of the substrate.

31. A method as defined in claim 30 wherein a waveguide is integrated beneath the surface of the substrate to be optically coupled to the first optical element and a second optical element when the first optical element is located in the first cavity and the second optical element is located in a second cavity.

32. A method of manufacturing an optical device comprising:
positioning a first optical element in a first cavity located in a substrate and dimensioned to passively align the first optical element with a second structure when the first optical element is inserted into the first cavity, further comprising securing the second structure to a surface of the substrate between the first cavity and a second cavity, wherein the second structure comprises a waveguide, the waveguide comprises a waveguide array, the waveguide array comprises a first waveguide channel and a second waveguide channel, and the first waveguide channel is vertically displaced from the second waveguide channel.

33. A method of manufacturing an optical device comprising:
positioning a first optical element in a first cavity located in a substrate and dimensioned to passively align the first optical element with a second structure when the first optical element is inserted into the first cavity, wherein the substrate comprises a first substrate, and further comprising positioning a second optical element in a second cavity located in a second substrate and dimensioned to passively align the second optical element with a third structure when the second optical element is inserted into the second cavity, wherein the second structure comprises a first waveguide, the third structure comprises a second waveguide, and further comprising coupling a flying waveguide to the first waveguide.

34. A method as defined in claim 33 wherein coupling a flying waveguide to the first waveguide further comprises inserting an alignment pin associated with at least one of the flying waveguide and the first waveguide into a bore defined in at least one of the first substrate and a connector associated with the flying waveguide to passively align the first waveguide and the flying waveguide.

35. A method as defined in claim 33 wherein the first waveguide, the second waveguide, and the flying waveguide respectively comprise a first waveguide array, a second waveguide array, and a flying waveguide array.

* * * * *